April 21, 1959  C. M. KUCERA ET AL  2,883,158
LAMINATED DRILL COLLAR
Filed Sept. 6, 1955

Clement M. Kucera
Robert G. Peter
INVENTORS

BY
ATTORNEYS

2,883,158
LAMINATED DRILL COLLAR

Clement M. Kucera and Robert G. Peter, Houston, Tex., assignors to Reed Roller Bit Company, Houston, Tex., a corporation of Texas Application September 6, 1955, Serial No. 532,628

4 Claims. (Cl. 255—28)

This invention relates to drill collars.

In the rotary drilling of deep wells, it is customary to employ one or more drill collars at the lower end of a string of drill pipe commonly known as a drill stem. A drill bit is connected to the lower end of the lowermost collar, and the upper end of the uppermost collar is connected to the lower end of the drill pipe or stem. Drill collars customarily are made much heavier than the drill pipe to provide the necessary weight for drilling. Also, the drill collars being on the lower end of the lighter and more flexible drill stem, tend to make the drill bit drill straight.

It is an object of this invention to provide a new and improved laminated drill collar.

Another object is to provide a drill collar which may be fabricated rather than being produced from a solid bar.

Another object is to provide a drill collar which will have adequate weight, and still remain somewhat flexible.

Another object is to provide a new and improved drill collar which will serve as an impact and vibration dampener during the drilling operation.

Another object is to provide a drill collar which will be economical to manufacture.

It is another object of this invention to provide a laminated drill collar wherein certain of the component parts thereof are loosely connected to certain other of the drill collar components.

Other objects and advantages of this invention will become apparent from the following description and accompanying drawings wherein is set forth by way of illustration an embodiment of this invention.

Figures 1, 2, 3:
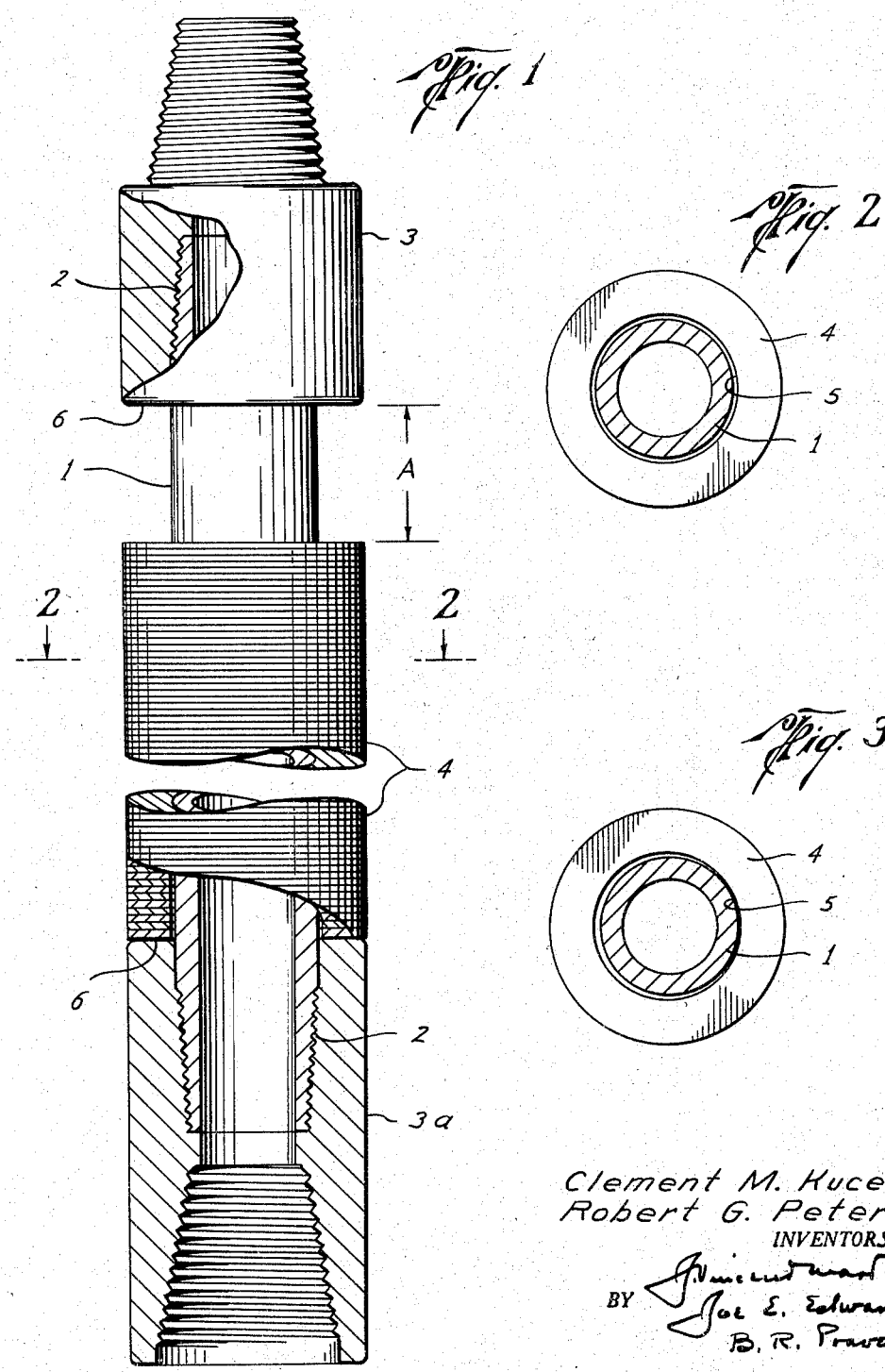
Fig. 1 is an elevational view partly in section of the drill collar.
Fig. 2 is a horizontal section view taken on a line 2—2 of Fig. 1.
Fig. 3 is a view similar to Fig. 2 showing a relationship which may exist between some of the component parts of the drill collar.

A relatively thin-walled pipe 1 threaded at both ends as at 2 forms the central member of the drill collar. Tool joint members 3 and 3a may be screwed on, or otherwise secured, to either end of the pipe 1. A plurality of circular washer elements 4 are provided on the pipe 1. The external diameter of the washers 4 may be substantially the same size as the external diameters of the tool joint members 3 and 3a.

As is clearly shown in Fig. 2, the washer elements 4 may have openings 5 therethrough which are of a slightly larger diameter than the external diameter of the pipe 1. For example, the opening 5 through the washer 4 may be one-sixteenth of an inch larger in diameter than the external diameter of the pipe 1 so that the washer elements 4 may have a limited transverse movement with respect to the pipe 1 as is shown in Fig. 3.

Referring to Fig. 1, the stacked height of the washer elements 4 is less than the distance between the abutting ends 6 of the tool joint members 3 and 3a resulting in the space as indicated at A. The space A, which is unoccupied by the washers 4 when they are stacked, is available for the accommodation of a lifting tool (not shown) to engage against the end 6 of the tool joint member 3 to raise or lower the drill collar out of or into a bore hole. It is contemplated that the length of the space A will be approximately twelve inches, but it is apparent that more or less space may be provided, as desired, by providing few or more washer elements 4 on the pipe 1. Since the washer elements 4 are not tightly engaged on the pipe 1, and since the stacked height of the washer elements 4 is less than the distance between the faces 6 of the tool joint members 3 and 3a, it is apparent that the washer elements 4 may have limited movement axially and transversely with respect to the pipe 1.

The subject drill collar will be economical to manufacture because there are no close tolerances required between the washer elements 4 and the pipe 1, and no heating or cooling of the washer elements 4 or of the pipe member 1 is required for the fabrication of the drill collar. The structure may utilize stamped metal washers 4 installed upon the pipe 1 which may be a length of standard, ordinarily available oil field pipe.

Since the washer elements 4 are free to move a limited distance axially and transversely with respect to the pipe, they will assist in reaming or conditioning irregularities in the wall of the bore hole. This drill collar will also act as a shock and vibration dampener since the central pipe member 1 must move as a single unit whereas the floating washer elements 4 may arrive individually at new equilibrium positions at separate points of time; therefore, the average acceleration of the entire mass of the drill collar is lower than it would be if the drill collar were made of a single piece. This results in reduced forces being imposed on the threaded portions of the pipe 1 and tool joint members 3 and 3a, and provides some flexibility to the drill collar. The dampening effect will be further enhanced since the washer elements 4 will tend to trap between them free well fluid standing in the bore hole if the drill collar is caused to move rapidly from its normal operating position. Additional friction caused by the fluid being trapped between the washers 4 and by the washers 4 traveling through the well fluid further inhibits the acceleration of the washer elements 4 upon sudden movement of the pipe 1.

The subject fabricated drill collar provides the necessary drill collar weight while providing some desired drill collar flexibility. Further these drill collars may be assembled in the field, and as the tool joint members 3 and 3a or the pipe 1 become worn, the washer elements 4 may be removed and re-installed on a new pipe section 1 containing new tool joint members 3 and 3a.

The invention is not limited to the embodiment herein disclosed. Various changes within the scope of the following claims will occur to those skilled in the art.

We claim:

1. A drill collar comprising a tubular member, a plurality of metallic washer elements mounted on said member, each of said elements having an opening through which the said member extends, the outer peripheries of the said elements serving to form substantially the major portion of the external surface of the drill collar, the said openings in the said elements being larger than the external diameter of the said tubular member to provide a space between said washer elements and said member, and a tool joint secured to each end of the said member, the distance between the said tool joint members being greater than the stacked height of the said washer elements to provide a space between said washer elements when stacked and one of said tool joint members, the said tool joint members serving to confine the said washer elements on the said tubular member.

2. A drill collar comprising a tubular member, a plurality of washer elements mounted on said member, each of said elements having an opening through which the said member extends, the outer peripheries of the said elements serving to form a substantial portion of the external surface of the drill collar, the said openings in the said elements being larger than the external diameter of the said tubular member, said washer elements being movable transversely of said tubular member, and a tool joint secured to each end of the said member, each tool joint having an external diameter greater than the internal diameter of each of said washer elements whereby said washer elements are limited in endwise movement on said tubular member.

3. A drill collar comprising a pipe member, a plurality of washer elements on the said pipe member, a tool joint member on either end of the said pipe member, the said washer elements extending exteriorly of said drill collar and being freely movable transversely and axially with respect to each other, each tool joint having an external diameter greater than the internal diameter of each of said washer elements whereby said washer elements are limited in endwise movement on said pipe member.

4. A drill collar comprising a pipe, tool joint members on each end of the said pipe, a plurality of circular washer elements each having a central opening therethrough mounted on the said pipe between the said tool joint members, the distance between the said tool joint members being greater than the stacked height of the said washer elements, to provide an exteriorly open lifting tool space between said washer elements when stacked and one of said tool joint members, each tool joint having an external diameter greater than the internal diameter of each of said washer elements whereby said washer elements are limited in endwise movement on said pipe.

References Cited in the file of this patent

UNITED STATES PATENTS

| | | |
|---|---|---|
| 1,594,498 | Day | Aug. 3, 1926 |
| 2,126,075 | Wright | Aug. 9, 1938 |
| 2,594,617 | Boice | Apr. 29, 1952 |